(12) United States Patent
Asano

(10) Patent No.: US 11,656,426 B2
(45) Date of Patent: May 23, 2023

(54) LENS APPARATUS AND IMAGING APPARATUS

(71) Applicant: CANON KABUSHIKI KAISHA, Tokyo (JP)

(72) Inventor: Kota Asano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 978 days.

(21) Appl. No.: 16/515,447

(22) Filed: Jul. 18, 2019

(65) Prior Publication Data

US 2020/0026024 A1 Jan. 23, 2020

(30) Foreign Application Priority Data

Jul. 19, 2018 (JP) .............................. JP2018-136104
Jul. 19, 2018 (JP) .............................. JP2018-136105

(51) Int. Cl.
*G02B 7/02* (2021.01)
*G03B 17/14* (2021.01)

(52) U.S. Cl.
CPC ............. *G02B 7/026* (2013.01); *G03B 17/14* (2013.01)

(58) Field of Classification Search
None
See application file for complete search history.

(56) References Cited

U.S. PATENT DOCUMENTS

| 9,958,636 | B2 | 5/2018 | Masuki | |
| 2010/0209097 | A1* | 8/2010 | Sasaki | G03B 17/14 |
| | | | | 396/529 |
| 2012/0287328 | A1* | 11/2012 | Kawai | G02B 7/102 |
| | | | | 348/E5.042 |
| 2013/0071101 | A1* | 3/2013 | Idera | G03B 17/14 |
| | | | | 396/531 |
| 2013/0163979 | A1* | 6/2013 | Kuroiwa | G03B 9/02 |
| | | | | 396/505 |

(Continued)

FOREIGN PATENT DOCUMENTS

JP 2002075106 A 3/2002
JP 5586895 B2 9/2014

(Continued)

OTHER PUBLICATIONS

Office Action issued in Japanese Appln. No. 2018-136104 dated May 10, 2022. English translation provided.

(Continued)

*Primary Examiner* — Cynthia Segura
(74) *Attorney, Agent, or Firm* — Rossi, Kimms & McDowell LLP

(57) ABSTRACT

A lens apparatus includes a fixed member having one of a click generator and a groove part in which a groove part is formed, an operation ring having the other of the click generator and the groove part, and rotatable relative to the fixed member, a click detector configured to detect contact between the click generator and the groove part, and a rotation detector configured to detect rotation of the operation ring. The groove part has groove portions and non-groove portions alternately arranged. The click generator is biased along an optical axis direction and is in contact with the groove part. The click detector and the rotation detector are disposed along the optical axis direction.

22 Claims, 5 Drawing Sheets

(56) References Cited

U.S. PATENT DOCUMENTS

| | | | | |
|---|---|---|---|---|
| 2013/0335589 A1* | 12/2013 | Yuge | ............... | H04N 5/23218 |
| | | | | 348/222.1 |
| 2015/0085156 A1* | 3/2015 | Yuge | ............... | H04N 5/23216 |
| | | | | 348/222.1 |
| 2015/0098004 A1* | 4/2015 | Ueda | ............... | G05G 5/03 |
| | | | | 74/504 |
| 2017/0176713 A1* | 6/2017 | Masuki | ............... | H04N 5/2254 |
| 2018/0203329 A1* | 7/2018 | Takeshita | ............... | G03B 7/01 |
| 2018/0217354 A1 | 8/2018 | Masuki | | |

FOREIGN PATENT DOCUMENTS

| | | | |
|---|---|---|---|
| JP | 2014194548 A | 10/2014 | |
| JP | 2015141232 A | 8/2015 | |
| JP | 2016206569 A | 12/2016 | |
| JP | 2017072474 A | 4/2017 | |
| JP | 2017102361 A | 6/2017 | |
| JP | 2018054787 A | 4/2018 | |

OTHER PUBLICATIONS

Office Action issued in Japanese Appln. No. 2018-136105 dated May 10, 2022. English translation provided.

\* cited by examiner

LENS APPARATUS AND IMAGING APPARATUS

BACKGROUND OF THE INVENTION

Field of the Invention

The present invention relates to a lens apparatus and an imaging apparatus.

Description of the Related Art

Japanese Patent No. ("JP") 5586895 discloses an imaging apparatus that adjusts the shutter speed and the ISO speed using an operation ring rotatable relative to a lens barrel. The imaging apparatus disclosed in JP 5586895 includes a click mechanism that generates a click feeling in response to a rotation operation of the operation ring.

In the imaging apparatus disclosed in JP 5586895, the number of pulses for detecting the rotation amount of the operation ring is as small as four pulses for each click position interval. In order to increase the number of pulses for each click position interval and secure a large rotation amount of the operation ring, for example, it is conceivable to separate an opening detected by a photo-reflector in an annular member from an opening for generating a click feeling. However, when these two openings are separated, the radial size of the lens barrel increases.

The imaging apparatus disclosed in JP 5586895 has no problem in changing the shutter speed and the ISO speed stepwise by performing the intermittent rotation operation of the operation ring for each click. However, the imaging apparatus is affected by the rotational velocity fluctuation of the operation ring by the click torque in an imaging scene in which a driven member, such as the diaphragm and the focus lens, is moved to an intended position by the rotation operation of the operation ring, when the exposure value is changed or the focus position is changed. As the rotational velocity of the operation ring fluctuates due to the click torque, the rotation detection pulse of the operation ring temporally increases or decreases, resulting in uneven driving of the driven member.

SUMMARY OF THE INVENTION

An aspect of embodiments provides, for example, a lens apparatus beneficial in a small radial size and a large rotation amount of an operation ring with a click mechanism.

Another aspect of embodiments provides, for example, a lens apparatus beneficial in small driving unevenness of a driven member in a rotation operation of an operation ring with a click mechanism.

A lens apparatus according to one aspect of the present invention includes a fixed member having one of a click generator and a groove part in which a groove part is formed, an operation ring having the other of the click generator and the groove part, and rotatable relative to the fixed member, a click detector configured to detect contact between the click generator and the groove part, and a rotation detector configured to detect rotation of the operation ring. The groove part has groove portions and non-groove portions alternately arranged. The click generator is biased along an optical axis direction and is in contact with the groove part. The click detector and the rotation detector are disposed along the optical axis direction.

A lens system according to another aspect of the present invention includes a fixed member having one of a click generator and a groove part in which a groove part is formed, an operation ring having the other of the click generator and the groove part, and rotatable relative to the fixed member, a rotation detector configured to detect rotation of the operation ring, and a controller configured to control a driven member driven based on a rotation operation of the operation ring. The controller is configured to control the driven member based on an average rotational velocity of the operation ring obtained based on the detected rotation.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 3:
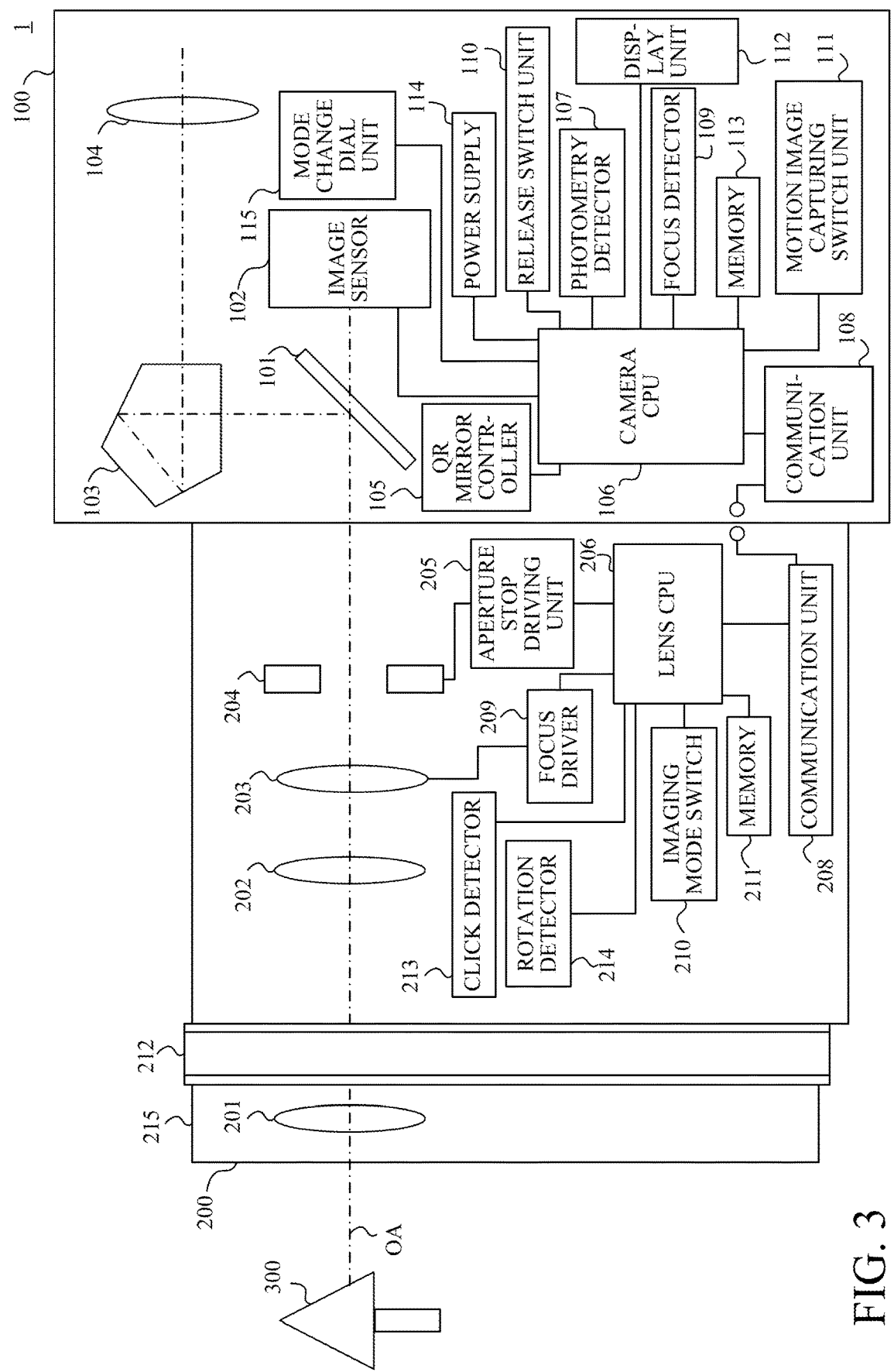
FIG. 3 is a block diagram of the imaging apparatus according to this embodiment.

Referring now to FIG. 3, a description will be given of an imaging apparatus (optical apparatus) according to this embodiment. FIG. 3 is a block diagram of the imaging apparatus (lens-interchangeable single-lens reflex camera) 1. The imaging apparatus 1 includes a camera body (imaging apparatus body) 100 and an interchangeable lens (lens apparatus) 200 that is attachable to and detachable from the camera body 100. However, the present invention is not limited to this embodiment, and is also applicable to an imaging apparatus (lens integrated type camera) in which the imaging apparatus body and the lens apparatus are integrated with each other.

In the interchangeable lens 200, reference numeral 201 denotes a first lens unit, reference numeral 202 denotes a magnification varying lens unit, reference numeral 203 denotes a focus lens unit, and reference numeral 204 denotes an aperture stop mechanism. Each of the first lens unit 201, the magnification varying lens unit 202, and the focus lens unit 203 includes a lens and a lens holding frame (not shown) for holding the lens. In this embodiment, the first lens unit 201, the magnification varying lens unit 202, the focus lens unit 203, and the aperture stop mechanism 204 constitute an imaging optical system.

A lens CPU 206 transmits and receives various information via the camera CPU 106, a communication unit 208 in the lens apparatus, and a communication unit 108 in the camera body, and controls the entire operation of the interchangeable lens 200 in cooperation with the camera CPU 106. The lens CPU 206 controls an aperture stop driving unit 205. More specifically, the lens CPU 206 controls the drive direction of the aperture stop driving unit 205 by changing the polarity of the diaphragm drive signal applied to the aperture stop driving unit 205, and controls the drive instruction value of the aperture stop driving unit 205 by increasing or decreasing the number of pulses of the diaphragm drive signal. Thereby, the lens CPU 206 can control an opening/closing amount of the plurality of diaphragm blades in the aperture stop mechanism 204.

Reference numeral 210 denotes an imaging mode switch operated by the user to switch between a still image capturing mode and a motion image capturing mode. This embodiment provides the imaging mode switch 210 to the interchangeable lens 200, but may provide it the camera body 100. A memory 211 includes a ROM or the like, and stores data of the drive pulse of the focus lens unit 203 and the drive pulse of the aperture stop mechanism 204. The lens CPU 206 can read out each data stored in the memory 211 if necessary.

The operation ring 212 is rotatably supported in the circumferential direction relative to a barrel (fixed member) 215 of the interchangeable lens 200, and has a click mechanism described later. The mode change dial unit 115 is disposed in the camera body 100, and can change (switch) a mode such as an aperture value (F-number), a shutter speed, an ISO speed, an exposure value, and a manual focus mode. When the operation ring 212 is rotated after the mode is changed, the set value is variable, such as the aperture value, the shutter speed, the ISO speed, the exposure value, and the focus position in the manual focus mode, based on the click detection signal detected by the click detector 213. The rotation detector 214 detects rotation detection information (rotational information such as a rotation amount, a rotation direction, and a rotational velocity) of the operation ring 212.

Figure 1:
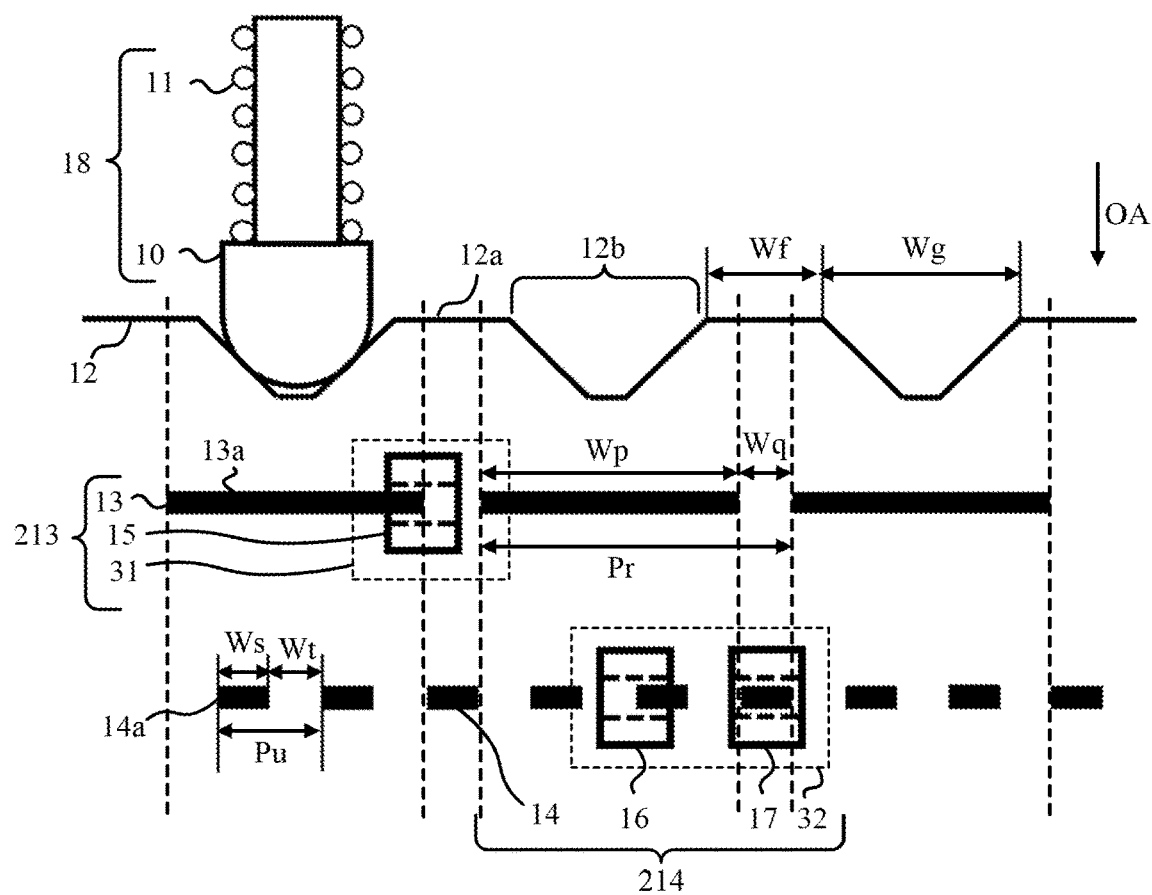
FIG. 1 explains a click mechanism, a click detector, and a rotation detector according to this embodiment.
Figure 2:
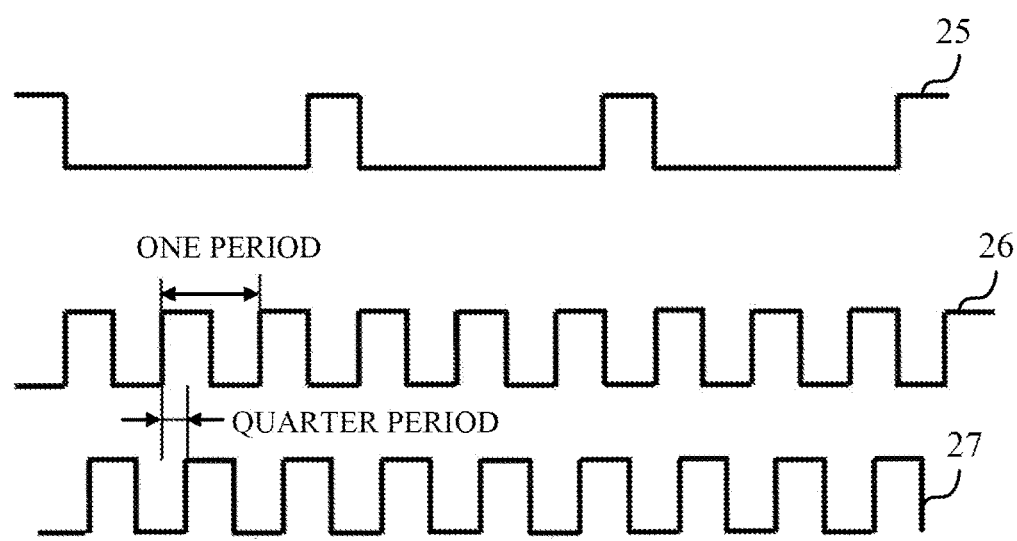
FIG. 2 explains a click detection signal and a rotation detection signal according to this embodiment.

Referring now to FIGS. 1 and 2, a description will be given of the click mechanism of the operation ring 212, the click detector 213, the rotation detector 214, the click detection signal, and the rotation detection signal. FIG. 1 explains the click mechanism, the click detector 213, and the rotation detector 214. FIG. 2 explains a click detection signal and a rotation detection signal.

A description will now be given of the click mechanism. A top in FIG. 1 is a plan view that develops click grooves or a groove part 12 disposed on or in the operation ring 212 (on or in an unillustrated annular member). The click groove 12 has plane portions (non-groove portion) 12a and groove portions 12b arranged at regular intervals and alternately in the circumferential direction on a plane orthogonal to the optical axis OA (on a plane orthogonal to the optical axis). The groove 12b is used as a click groove. In FIG. 1, Wf is a width in a circumferential direction of the plane (or flat) portion 12a, and Wg is a width in the circumferential direction of the groove 12b. In this embodiment, the click groove 12 may have a through hole portion having no bottom in place of the groove 12b.

A click feeling generator or click generator 18 has a shaft member 10 and a spring (biasing member) 11. The shaft member 10 is provided on the barrel (fixed member) 215 of the interchangeable lens 200 so as to face the click groove 12 in the optical axis direction OA. A tip of the shaft member 10 has a curved shape such as an R shape. The spring 11 biases the shaft member 10 in the direction (optical axis direction) toward the click groove 12. The shaft member 10 is disposed while biased by the spring 11 in the direction toward the click groove 12. Thus, the click feeling generator 18 is configured to generate a click feeling according to the rotation of the operation ring 212 while the click feeling generator 18 is biased in the optical axis direction and contacts the click groove 12. In other words, a click feeling is generated as the operation ring 212 is rotated while the spring 11 biases the shaft member 10 toward the click groove 12.

As the operation ring 212 is rotated, an unillustrated annular member rotates integrally with the operation ring 212, and the shaft member 10 of the click feeling generator 18 slides on the surface of the plane portion 12a or the shaft member 10 is engaged with the groove portion 12b, and a click feeling is generated. This embodiment can provide a desired click feeling by adjusting the shape of the groove 12b or by adjusting the biasing force of the spring 11. In this embodiment, the shaft member 10 is an integrally formed shaft member whose tip has the R shape, but the present invention is not limited to this embodiment. As long as the tip has the curved surface, such as the R shape, the same effect can be obtained even if it includes two components, such as a ball member and a shaft member.

A description will now be given of the reason why the click mechanism is required. The click mechanism is used to change the setting of the imaging condition for each click in each mode selected by the mode change dial unit 115 as described above. For example, an operation ring having no click feeling has no mechanism for retaining it at a predetermined position. Thereby, although the operation ring can be easily rotated, it is likely to rotate unintentionally and thus is difficult to position the operation ring at the intended location. Hence, a mechanism, such as the click mechanism that does not unintentionally rotate the operation ring, may be used to position the operation ring to the intended set value in changing the settings of the imaging condition in each of the above modes.

Next follows a description of the click detector 213. The middle of FIG. 1 illustrates the linearly developed light shield plate 13 disposed on the operation ring 212 and an unillustrated annular member, radially inwardly protruding, and used for a click detection. The click detector 213 has the light shielding plate (first light shielding plate) 13 and a photo-interrupter (first light detector) 15 mounted on a flexible printed circuit (first flexible printed circuit) 31. The light shielding plate 13 is provided on the operation ring 212, and the photo-interrupter 15 is provided on the barrel (fixed member) 215.

This configuration enables the click detector 213 to detect the contact position information between the click feeling generator 18 and the click groove 12. The click detector 213 outputs a click detection signal 25 as the light shielding portions 13a configured to rotate with the operation ring 212 and arranged at regular intervals in the circumferential direction pass the photo-interrupter 15 attached to the barrel 215.

In FIG. 1, Wp is a width in the circumferential direction of the light shielding portion (first light shielding portion) 13a of the light shielding plate 13, Wq is a width in the circumferential direction (opening width) having no light shielding portion 13a, and Pr is an addition of the width Wp of the light shielding portion 13a and the width (opening width) Wq. The light shielding plate 13 is used to detect that the shaft member 10 is positioned at the plane portion 12a or the groove 12b. When the light shielding plate 13 is provided on the operation ring 212, an assembly is made such that the circumferential center of the groove portion 12b of the click groove 12 and the circumferential center of the width Wp of the light shielding portion 13a substantially coincide with each other.

The photo-interrupter 15 is a click detector (first light detector). The photo-interrupter 15 is disposed on a pitch circle passing the center of the light shielding plate 13 in the thickness direction of the unillustrated annular member in the optical axis direction. The photo-interrupter 15 outputs the click detection signal 25 illustrated at the top of FIG. 2 when the light shielding plate 13 passes through a slit (between broken lines in FIG. 1) of the photo-interrupter 15. The photo-interrupter 15 outputs a low level signal when the light shielding plate 13 passes through the slit in the photo-interrupter 15 and the photo-interrupter 15 is shielded from the light, and outputs a high level signal when the light shielding plate 13 does not pass through the slit in the photo-interrupter 15 and the photo-interrupter 15 is not shielded from the light.

This embodiment may set the width Wg of the groove 12b and the width Wp of the light shielding plate 13 to be different from each other (Wg≠Wp or set as Wg>Wp or Wg<Wp). This configuration enables the click feeling generation timing based on the operation of the operation ring 212 to coincide with the detection timing by the click detector 213. When the interchangeable lens 200 is replaced with another interchangeable lens, the shift tendency caused by the tolerance between the click feeling generation timing and the detection timing can be maintained (as to which is earlier, the click feeling generation timing or the detection timing). This embodiment sets the width Wg to be larger than the width Wp (Wg<Wp).

Thereby, the circuit is designed so that as the operation ring 212 is rotated, the unillustrated annular member is integrally rotated with the operation ring 212, and the click detection signal 25 is always low while the shaft member 10 is engaged with the groove portion 12b. This embodiment recognizes that the shaft member 10 is engaged with the groove portion 12b while the click detection signal 25 is low, and provides a setting change start command in each mode selected by the mode change dial unit 115. This embodiment uses the photo-interrupter 15 as the click detector, but can provide the same effect by replacing it with a photo-reflector or a magnetic detector.

Next follows a description of the rotation detector 214. The bottom of FIG. 1 shows the linearly developed light shielding plate 14 disposed on the operation ring 212 and an unillustrated annular member, and radially inwardly protruding. The rotation detector 214 includes a light shielding plate (second light shielding plate) 14, a photo-interrupter (second light detector) 16 and a photo-interrupter (third light detector) 17 mounted on a flexible printed circuit board (second flexible printed circuit board) 32. The light shielding plate 14 is provided on the operation ring 212, and the photo-interrupters 16 and 17 are provided on the barrel (fixed member) 215. The rotation detector 214 outputs the rotation detection signals 26 and 27 when the light shielding portions (second light shielding portions) 14a configured to rotate integrally with the operation ring 212 and arranged at regular intervals in the circumferential direction pass the photo-interrupters 16 and 17 attached to the barrel 215.

In FIG. 1, Ws is a width in the circumferential direction of the light shielding portion 14a of the light shielding plate 14, Wt is a width in the circumferential direction (opening width) having no light shielding portion 14a, and Pu is a width (pitch) that is an addition of a width Ws and a width (opening width) Wt of the light shielding portion 14a. The light shielding plate 14 is used to detect a rotation amount and a rotation direction of the operation ring 212. The photo-interrupters 16 and 17 are rotation detectors (second light detector, third light detector). The photo-interrupters 16 and 17 are disposed on a pitch circle passing the center of the light shield plate 14 in the thickness direction of the unillustrated annular member in the optical axis direction.

When the light shielding plate 14 passes through the slits (between broken lines in FIG. 1) in the photo-interrupters 16 and 17, rotation detection signals 26 and 27 in the middle and bottom of FIG. 2 are output. The photo-interrupters 16 and 17 output low level signals when the light shielding plate 14 pass through the slits in the photo-interrupters 16 and 17 and shield light, and output high level signals when the light shielding plate 14 does not pass the slits of the photo-interrupters 16 and 17 and does not shield the light. When the continuous high level and low level section of the rotation detection signal 26 are set to one period, the photo-interrupters 16 and 17 are arranged such that the rotation detection signals 26 and 27 shift from each other by a quarter period.

The shapes of the light shielding plates 13 and 14 are set such that the rotation detection signals 26 and 27 output high level and low level signal changes (periods) more than that of the click detection signal 25. In other words, the period of each of the rotation detection signals 26 and 27 is shorter than that of the click detection signal 25 (the relationship of Pu<Pr is satisfied). The lens CPU 206 receives the rotation detection signals 26 and 27 from the rotation detector 214, and calculates the rotation amount and the rotation direction of four pulses per period based on the rotation detection signals 26 and 27. This embodiment uses a photo-interrupter as the rotation detector, but can provide similar effects by replacing it with a photo-reflector or a magnetic detector.

This embodiment outputs a rotation amount of 12 pulses until the click detection signal 25 switches from the low level to the high level and then from the low level to the high level. Thereby, when the operation ring 212 is rotated, a large rotation amount can be secured per interval between the spots that provide the click feeling (the groove portion 12b of the click groove 12). Since a large amount of rotation can be secured, the user can obtain an operation feeling almost as intended with the operation of the operation ring 212 in changing the aperture value or acquiring the focus position in the manual focus mode.

Referring now to FIGS. 1 and 2, a description will be given of a method for more accurately detecting the state in which the shaft member 10 is engaged with the groove portion 12b in the click groove 12. FIG. 1 illustrates that the shaft member 10 is engaged with the groove 12b located at the leftmost position of the click groove 12. When the click detection signal 25 switches from the left to the right in FIG. 2, there is the engagement timing of the shaft member 10 after switching from the high level to the low level. Conversely, when the click detection signal 25 switches from the right to the left in FIG. 2, there is the engagement timing of the shaft member 10 after switching from the high level to the low level. In other words, there is a switch from the high level to the low level of the click detection signal 25 on both sides of the engagement timing of the shaft member 10.

The pulses calculated by the rotation detection signals 26 and 27 are measured from when the signal switches for each rotation direction to when the shaft member 10 is engaged with the groove 12b. Then, the measured pulse is stored in the memory 211 in the interchangeable lens 200, and the pulse counted position calculated based on the rotation detection signals 26 and 27 after signal switches is associated with the engagement timing of the shaft member 10. In other words, the memory 211 stores the rotation amount information for each rotation direction, from when the click detection signal switches to when the click feeling generator 18 enters the groove portion 12b in the click groove 12. Then, the lens CPU 206 outputs the click detection information when the click feeling generator 18 enters the groove portion 12b based on the rotation amount information. Thereby, as soon as the shaft member 10 is engaged with the groove portion 12b in the click groove 12, a setting change start command can be issued in each mode selected by the mode change dial unit 115, thereby the operability can improve.

Figure 4:
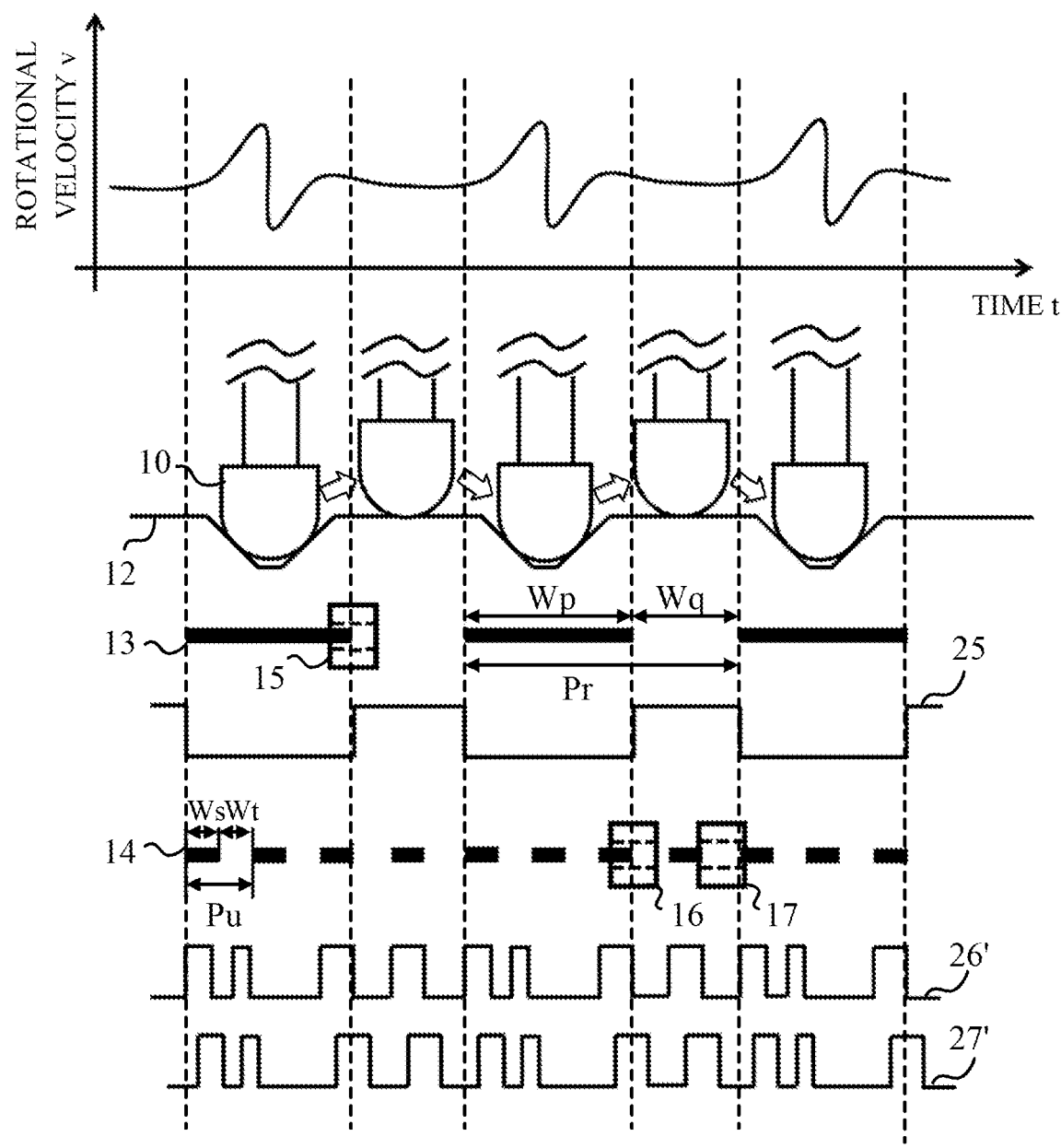
FIG. 4 explains a rotational velocity fluctuation of an operation ring due to a click torque according to this embodiment.

Next follows a description of the rotational velocity fluctuation of the operation ring 212 due to the click torque. Now assume an imaging scene in which the lens is moved to the intended position by the rotation operation, for example, with the operation ring 212 having the click mechanism according to this embodiment, with the exposure value changed by driving the diaphragm, and with the focus position changed by the focus driving. In the imaging scene at this time, the click torque of the click mechanism affects the rotational velocity fluctuation of the operation ring 212. Referring now to FIG. 4, a description will be given of this influence.

FIG. 4 explains the rotational velocity fluctuation of the operation ring 212 generated due to the click torque. There are two differences from FIG. 1. The first difference is to add a graph that illustrates a behavior of the operation ring 212 when the shaft member 10 slides on the surface of the plane portion 12a relative to the click groove 12 or is engaged with the groove portion 12b, in which the abscissa axis is set to time t and the ordinate axis is set to the rotational velocity v of operation ring 212. In the graph in FIG. 4, the rotational velocity v of the operation ring 212 significantly changes before and after the shaft member 10 is engaged with the click groove 12. This behavior occurs in the operation ring 212 having a general click mechanism.

The second difference is to reproduce the state in which the rotation detection signals 26 and 27 are affected by the fluctuation of the rotational velocity v of the operation ring 212 and the temporal increase or decrease are reproduced (rotation detection signals 26' and 27'). As soon as the rotational velocity v of the operation ring 212 in the graph increases, the temporal switching periods of the rotation detection signals 26' and 27' become short. On the other hand, as soon as the rotational velocity v of the operation ring 212 decreases, the temporal switching periods of the rotation detection signals 26' and 27' become longer. While the shaft member 10 slides on the surface of the plane portion 12a, the rotational velocity v of the operation ring 212 is substantially constant, so that the temporal switching periods of the rotation detection signals 26' and 27' are also approximately constant. It is thus difficult to realize the rotation operation while the rotational velocity v of the operation ring 212 having the click mechanism is maintained constant. Hence, when the lens or the diaphragm is driven based on the rotation detection signals 26' and 27', the driving becomes uneven (the lens or diaphragm cannot be stably driven).

Figure 5A:
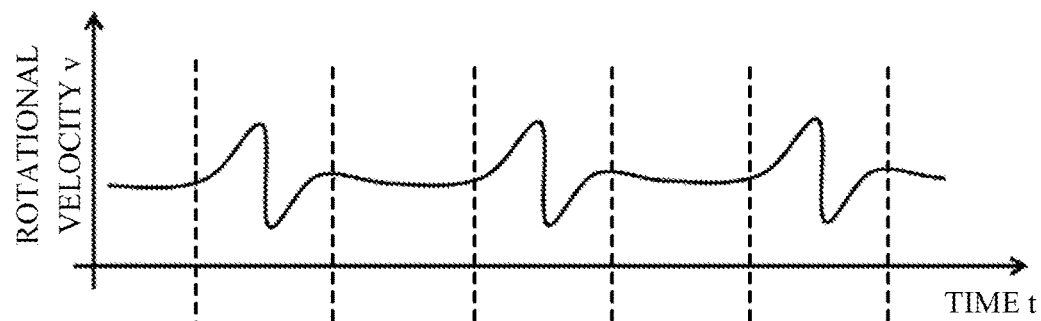
FIGS. 5A and 5B explain a control method of the imaging apparatus according to this embodiment.
Figure 5B:
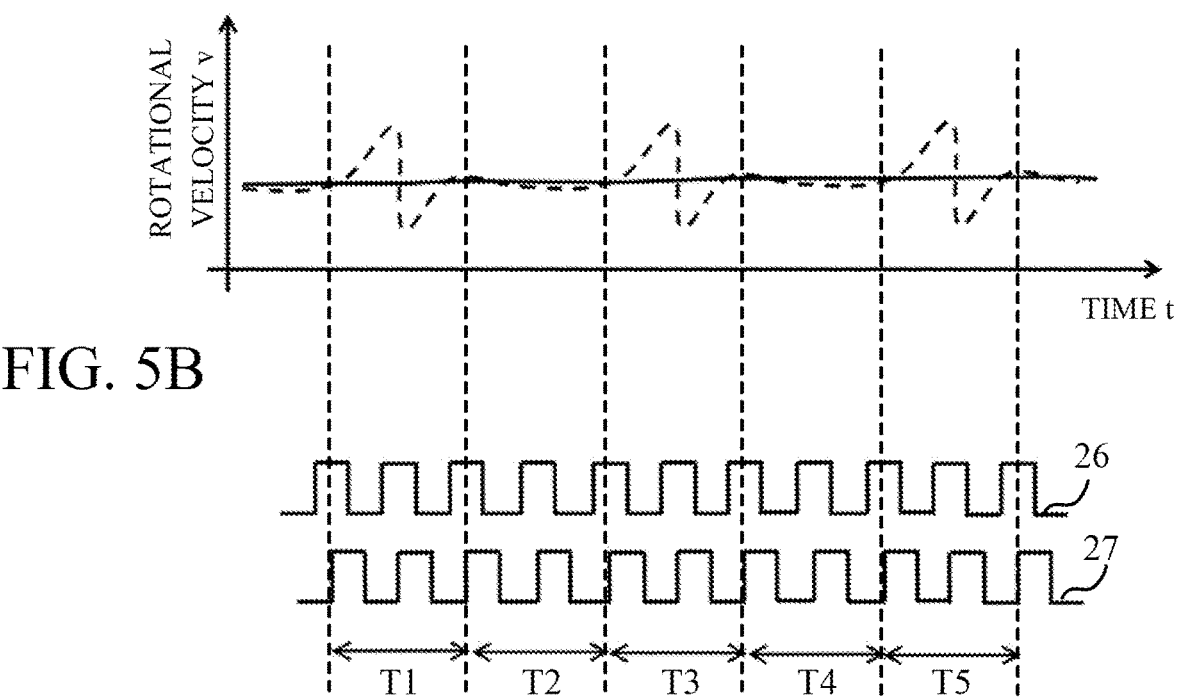
Figure 6:
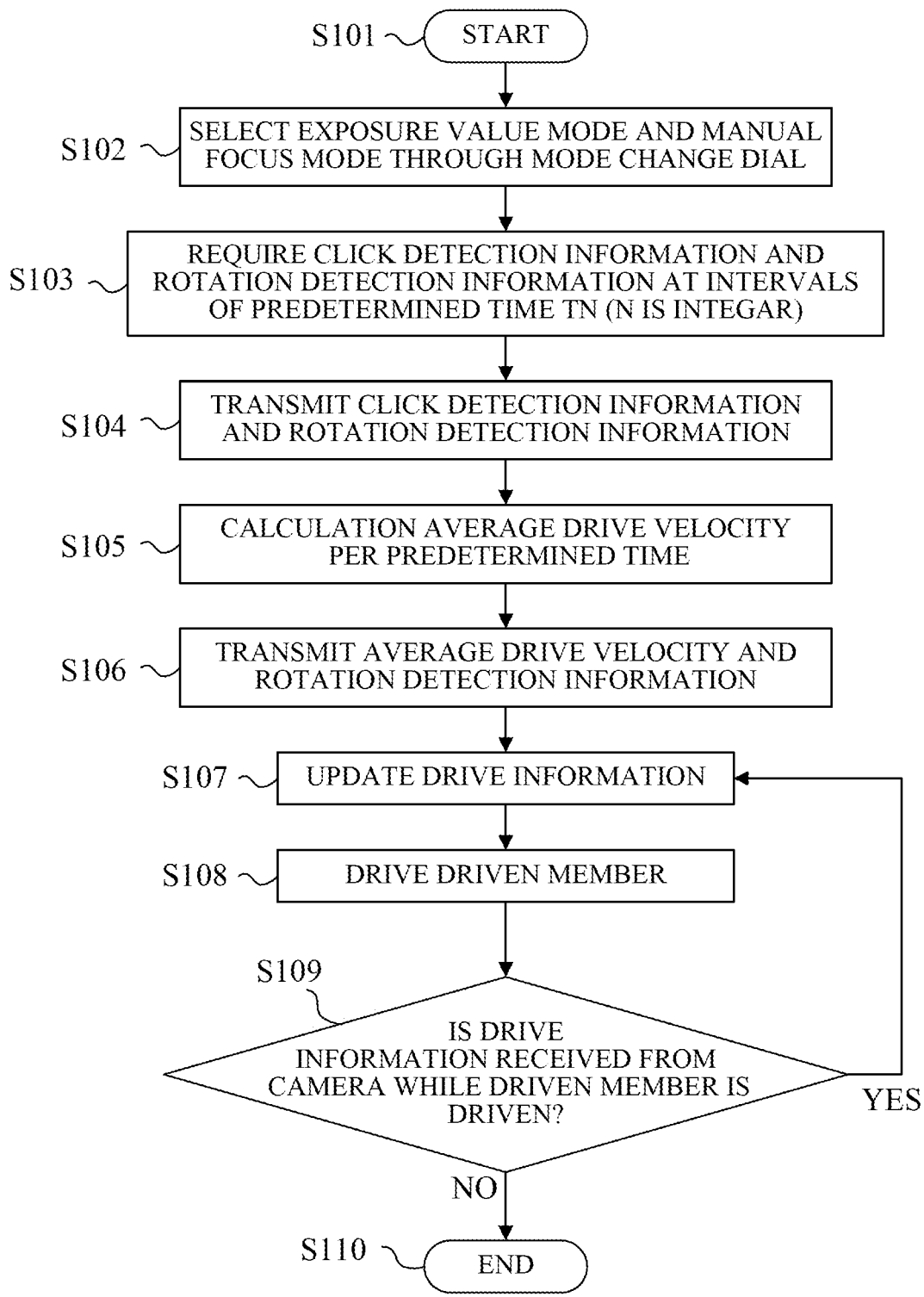
FIG. 6 is a flowchart showing a control method of the imaging apparatus according to this embodiment.

Accordingly, this embodiment drives the lens or diaphragm with reduced driving unevenness, even when the rotation operation is performed using the operation ring 212 including the click mechanism. Referring now to FIGS. 5A, 5B, and 6, a description will be given of a concrete method.

FIGS. 5A and 5B explain a control method (driving method) of the imaging apparatus 1. FIG. 5A illustrates a relationship between the behavior of the rotational velocity v relative and time t of the operation ring 212 and the rotation detection signals 26' and 27' at that time and a predetermined time extracted from FIG. 4. This embodiment sets times T1, T2, T3, T4, and T5 to the predetermined time. Each predetermined time is set to the same time (fixed time) such as 1 second, 1/30 second, 1/60 second, etc., but the invention is not limited to this example. This embodiment sets the predetermined time to a time interval at which the camera CPU 106 requests the lens CPU 206 for the click detection information and rotation detection information of the interchangeable lens 200 when each mode is selected by the mode change dial unit 115 in the camera body 100. However, the present invention is not limited to this embodiment.

FIG. 6 is a flowchart showing a control method (driving method) of an imaging apparatus 1 and used to drive the lens or diaphragm to reduce the drive unevenness when the rotation operation is performed with the operation ring 212 having the click mechanism. Each step in FIG. 6 is mainly executed based on an instruction from the camera CPU 106 or the lens CPU 206.

Initially, in the step S101, the user starts operating the camera body 100. Next, in the step S102, the user selects each mode by the mode change dial unit 115 of the camera body 100. This embodiment will describe the case where the manual focus mode or the exposure value mode is selected by the mode change dial unit 115.

Next, in the step S103, the camera CPU 106 sets a predetermined time (predetermined time interval) Tn (n is an integer). The camera CPU 106 requests the lens CPU 206 for the click detection information and rotation detection information of the interchangeable lens 200 at an interval of a predetermined time Tn. The rotation detection information is information on the rotation amount and rotation direction of the operation ring 212. This embodiment sets the predetermined time Tn to one second. Next, in the step S104, the lens CPU 206 reads the click detection information and the rotation detection information of the interchangeable lens 200 requested by the camera CPU 106. Then, the lens CPU 206 transmits the click detection information and the rotation detection information to the camera CPU 106 via the communication units 208 and 108.

Next, in the step S105, the camera CPU 106 calculates an average drive velocity per predetermined time (average rotational velocity of the operation ring 212) based on the rotation detection information (rotation amount information acquired from the rotation detection signals 26 and 27) received from the lens CPU 206. In this embodiment, each of the rotation amounts per predetermined times T1 to T5 in FIG. 5A is eight pulses. This embodiment can obtain a driving velocity of eight pulses per one second, since the predetermined time Tn is set to 1 second. The camera CPU 106 stores the velocity information corresponding to one pulse of the rotation amount, and determines this calculated velocity (average drive velocity) as a drive velocity for the lens or diaphragm driving.

Next, in the step S106, the camera CPU 106 transmits the drive velocity (average drive velocity) determined in the step S105 and the rotation detection information (rotation amount and rotation direction) to the lens CPU 206. Next, in the step S107, the lens CPU 206 updates drive information for driving the focus lens unit 203 or the aperture stop mechanism 204 as information to be transmitted to the focus driver 209 or the aperture stop driving unit 205. Then, the lens CPU 206 transmits the updated drive information to the focus driver 209 or the aperture stop driving unit 205. Next, in the step S108, the focus driver 209 or the aperture stop driving unit 205 drives the focus lens unit 203 or the aperture stop mechanism 204 based on the drive information received from the lens CPU 206.

Next, in the step S109, while the focus driver 209 drives the focus lens unit 203 or the aperture stop driving unit 205 drives the aperture stop mechanism 204, the lens CPU 206 determines whether or not it has received new drive information from the camera CPU 106. In other words, the lens CPU 206 determines whether or not a new click detection signal is output from the click detector 213 while the focus lens unit 203 or the aperture stop mechanism 204 is being driven. If the lens CPU 206 receives the new drive information, the flow returns to the step S107. In the step S107, the lens CPU 206 updates drive information for driving the focus lens unit 203 or the aperture stop mechanism 204, and transmits the updated drive information to the focus driver 209 or the aperture stop driving unit 205.

For example, when the focus lens unit 203 or the aperture stop mechanism 204 is currently driven at a low velocity, the operation ring 212 is quickly rotated so as to calculate a higher drive velocity. In such a case, driving the focus lens unit 203 or the aperture stop mechanism 204 with the latest drive information as needed can improve the operation feeling by the rotation operation of the operation ring 212.

On the other hand, if the lens CPU 206 does not receive the new drive information from the camera CPU 106 while the focus driver 209 or the aperture stop driving unit 205 is driving the focus lens unit 203 or the aperture stop mechanism 204 in the step S109, the flow proceeds to the step S110. In the step S110, the driving of the focus lens unit 203 or the aperture stop mechanism 204 ends.

Thus, in this embodiment, the lens CPU (controller) 206 controls a driven member (the focus lens unit 203 or the aperture stop mechanism 204) by the rotation operation of the operation ring 212. More specifically, the lens CPU 206 controls the driven member based on the average rotational velocity of the operation ring 212 (average drive velocity of the driven member) calculated using the rotational velocity of the operation ring 212 detected by the rotation detector 214. While the driven member is the focus lens unit 203 or the aperture stop mechanism 204 in this embodiment, the present invention is not limited to this embodiment and is applicable to other members.

At the predetermined time T1 in FIG. 5A, the rotational velocity of the operation ring 212 fluctuates, and a difference occurs in temporal switching between the rotation detection signals 26' and 27'. On the other hand, this embodiment can reduce the driving unevenness by calculating the average drive velocity per predetermined time and by driving the focus lens unit 203 or the aperture stop mechanism 204. FIG. 5B illustrates the reduced rotational velocity fluctuation of the operation ring 212 due to the click torque and the reduced difference in the temporal switching between the rotation detection signals 26 and 27 during the predetermined times T1 to T5. The top in FIG. 5B schematically reproduces the behavior of the operation ring 212 based on the temporal switches of the rotation detection signals 26 and 27. A solid line illustrates the behavior of the operation ring 212 based on the rotation detection signals 26 and 27, and a broken line illustrates the behavior of the operation ring 212 based on the rotation detection signals 26' and 27'.

While this embodiment sets the rotation amount of 12 pulses to be output for the switching of the click detection signal 25, but the present invention is not limited to this embodiment. Depending on the configuration of each light shielding plate and the configuration of each detector, more detection pulses can be output. In this embodiment, when the click detection signal 25 switches from the high level to the low level, the click detector 213 transmits the click detection signal 25 to the lens CPU 206. The click detection signal 25 from the click detector 213 to the lens CPU 206 may be transmitted when the click detection signal 25 switches from the low level to the high level by changing the circuit design.

The rotation detector 214 transmits to the lens CPU 206 the rotation detection signals 26 and 27 when the operation ring 212 is rotated. When the lens CPU 206 receives the click detection signal 25 from the click detector 213, the lens CPU 206 calculates the rotation amounts and the rotation directions of the rotation detection signals 26 and 27 received from the rotation detector 214 when the click detection signal 25 was received at the last time.

In FIG. 3, when the operation ring 212 is rotated, the lens CPU 206 sends the click detection information (click detection signal) and the rotation detection information (rotation amount and rotation direction) to the camera CPU 106 via the communication unit 208 and the communication unit 108 in the camera. For example, in changing the aperture value or in acquiring the focus position in the manual focus mode, the camera CPU 106 causes the lens CPU 206 to confirm the click detection information of the operation ring 212 and the operation information such as the rotation pulse amount and the rotation direction (information on the operation of the operation ring 212). The camera CPU 106 calculates drive information of the aperture stop driving unit 205 or the focus driver 209 of the interchangeable lens 200 based on the operation information from the lens CPU 206. Thereafter, the camera CPU 106 transmits drive information of the aperture stop driving unit 205 or the focus driver 209 to the lens CPU 206 based on the mode information set by the mode change dial unit 115. The lens CPU 206 controls the aperture stop driving unit 205 or the focus driver 209 based on the drive information to drive the aperture stop mechanism 204 or the focus lens unit 203. Then, the camera CPU 106 updates set value information displayed on the display unit 112.

As illustrated in FIG. 1, the click detector 213 having the light shielding plate 13 and the photo-interrupter 15 and the rotation detector 214 having the light shielding plate 14 and the photo-interrupters 16 and 17 are disposed along the optical axis direction. This arrangement can reduce the radial size of the interchangeable lens 200. Thus, this embodiment can secure a large rotation amount while suppressing the size of the interchangeable lens 200 in the radial direction.

In addition, when the photo-interrupters 15, 16, and 17 are arranged so that they overlap one another in the optical axis direction, the flexible printed boards 31 and 32 interfere with each other and it becomes difficult to reduce the size of the interchangeable lens 200 in the optical axis direction. Accordingly, as illustrated in FIG. 1, this embodiment arranges the photo-interrupter 15 of the click detector 213 and the photo-interrupters 16 and 17 of the rotation detector 214 so that they do not overlap each other in the optical axis direction. In other words, the photo-interrupters 15, 16, and 17 are arranged at mutually different positions (phases) in the circumferential direction. The flexible printed boards 31 and 32 may be disposed so as not to overlap each other in the optical axis direction. Thereby, the mounting spaces of the photo-interrupters 15, 16, and 17 on the flexible printed circuit boards 31 and 32 and the space necessary for mounting the components of the interchangeable lens 200 can be arranged without interference. Thus, the size in the overall length direction (optical axis direction) of the interchangeable lens 200 can be further reduced.

As illustrated in FIG. 3, light from the object 300 passes through the imaging optical system in the interchangeable lens 200 and enters the camera body 100. When the quick return mirror 101 in the camera body 100 is retracted from the light path, the light from the object 300 reaches the imaging plane of the imaging unit 102. The imaging unit 102 has a photoelectric conversion element (image sensor) such as a CCD sensor or a CMOS sensor, and photoelectrically converts an object image (optical image) formed through an imaging optical system. On the other hand, when a quick return mirror 101 is disposed in the optical path, the light from the object 300 is reflected by the quick return mirror 101 and guided to a pentaprism 103. The light reflected by the pentaprism 103 passes through a viewfinder optical system 104 and is guided to the eye of the user. Thereby, the user can visually recognize the object image.

A quick return mirror controller (QR mirror controller) 105 controls the moving up and down operation of the quick return mirror 101 based on the control signal from the camera CPU 106. A photometry detector 107 calculates the object luminance from the output signal of the imaging unit 102 or an image signal generated by an unillustrated image processing circuit described later, and outputs the calculated luminance to the camera CPU 106 as photometric information. A focus detector 109 detects the focus state of the imaging optical system by a phase difference detection method using the light reflected by an unillustrated sub mirror provided behind the quick return mirror 101 in the still image capturing mode. Then, the focus detector 109 outputs the focus information indicating the focus state to the camera CPU 106. The camera CPU 106 controls the position of the focus lens unit 203 via the focus driver 209 based on the focus information to obtain an in-focus state.

In the motion image capturing mode, the camera CPU 106 generates contrast information indicating a contrast state of an image from the image signal generated by an image processing circuit described later. Then, the camera CPU 106 controls the position of the focus lens unit 203 based on the contrast information, and obtains the in-focus state. The camera CPU 106 controls the aperture value to be set by the aperture stop mechanism 204 and the exposure amount of the imaging unit 102 in the still image capturing mode by the unillustrated exposure controller based on photometric information, and calculates the operation speed of the unillustrated shutter.

A release switch unit 110 outputs a SW1 signal when the user performs a half-press operation (SW1_ON), and outputs a SW2 signal when the user performs a full press operation (SW2_ON). The camera CPU 106 starts the still image imaging preparation operation, such as the photometry and focus detection, in response to the input of the SW1 signal, and starts the imaging operation of the still image for recording in response to the input of the SW2 signal. A motion image capturing switch unit 111 alternately outputs a motion image capturing start signal and a motion image capturing stop signal whenever the user operates it. The camera CPU 106 starts the imaging operation of the motion image for recording in response to the input of the motion image capturing start signal, and stops the imaging operation in response to the input of the motion image capturing stop signal. This embodiment provides the motion image capturing switch unit 111 separate from the release switch unit 110, but the release switch unit 110 may serve as the motion image capturing switch unit 111.

The image processing circuit generates a digital image signal by performing an amplification and various image processing for the imaging signal output from the imaging unit 102. The camera CPU 106 generates a still image for recording, a motion image for displaying, and a motion image for recording, using this digital video signal. The motion image for displaying is displayed as an electronic viewfinder image on the display unit 112 including a display device such as an LCD panel. A recorder 113 records a still image for recording and a motion image for recording in a recording medium such as a semiconductor memory. A power supply 114 supplies the power to each component in the camera body 100.

Thus, in this embodiment, the controller (lens CPU 206) controls the driven member based on the average rotational velocity of the operation ring 212 calculated using the rotational velocity of the operation ring 212. The average rotational velocity may be an average rotational velocity per predetermined time calculated based on the rotational velocity of the operation ring acquired in a predetermined time. The lens apparatus may be attachable to and detachable from the camera body, and the controller may transmit the rotational velocity of the operation ring to the camera body in response to a request from the camera body, receives the average rotational velocity calculated by the camera body, and controls the driven member based on the average rotational velocity.

This embodiment can provide a lens apparatus and an imaging apparatus, each of which can make smaller a radial size while securing a large rotation amount of the operation ring having the click groove.

This embodiment can provide a lens apparatus and an imaging apparatus, each of which can reduce the driving unevenness of the driven member in rotating the operation ring having the click groove.

This embodiment provides the click feeling generator 18 to the barrel (fixed member) 215 and the click groove 12 to the operation ring 212, but may provide the click feeling generator to the operation ring and the click groove 12 to the barrel (fixing member) 215. In other words, the barrel 215 includes one of the click feeling generator 18 and the click groove 12, and the operation ring 212 includes the other of the click feeling generator and the click groove 12. This embodiment describes the imaging apparatus (lens apparatus) including the operation ring that generates a click feeling, but the present invention is not limited to this embodiment and is applicable to an optical apparatus other than the imaging apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2018-136104, filed on Jul. 19, 2018, and 2018-136105, filed on Jul. 19, 2018, each of which is hereby incorporated by reference herein in its entirety.

What is claimed is:

1. A lens apparatus comprising:
a fixed member having one of a click generator and a groove part in which a groove is formed;
an operation ring having the other of the click generator and the groove part, and rotatable relative to the fixed member;
a click detector configured to detect a relative position between the click generator and the groove part, the click detector including a first light shielding plate disposed on the operation ring and having first light shielding portions, and a first light detector disposed on the fixed member; and
a rotation detector configured to detect rotation of the operation ring, the rotation detector including a second light shielding plate disposed on the operation ring and having a second light shielding portion, and a second light detector and a third light detector disposed on the fixed member,
wherein the groove part has groove portions and non-groove portions alternately arranged,
wherein the click generator is biased along an optical axis direction and is in contact with the groove part, and
wherein the click detector and the rotation detector are disposed along the optical axis direction.

2. The lens apparatus according to claim 1, wherein the groove portions and the non-groove portions are arranged in a cycle.

3. The lens apparatus according to claim 1, wherein the click generator includes a shaft member facing the groove part in the optical axis direction, and a biasing member biasing the shaft member in the optical axis direction toward the groove part.

4. The lens apparatus according to claim 3, wherein a tip of the shaft member has a round shape.

5. The lens apparatus according to claim 3, wherein the click generator is configured to generate a click feeling by the biasing member biasing the shaft member toward the groove part during rotation of the operation ring.

6. The lens apparatus according to claim 1, wherein the click detector is configured to output a click detection signal by shielding light to the first light detector by the first light shield portions rotated with the operation ring.

7. The lens apparatus according to claim 1, wherein a width in a rotation direction of one of the first light shielding portions is different from that of one of the groove portions.

8. The lens apparatus according to claim 7, wherein a width in a rotation direction of one of the first light shielding portions is larger than that of one of the groove portions.

9. The lens apparatus according to claim 7, wherein a width in a rotation direction of one of the first light shielding portions is smaller than that of one of the groove portions.

10. The lens apparatus according to claim 1, wherein the rotation detector is configured to output a rotation detection signal by shielding light to the second light detector and the third light detector by the second light shielding portions rotated with the operation ring.

11. The lens apparatus according to claim 1, wherein a pitch in a rotation direction of the second light shielding portions is smaller than that of the first light shielding portions.

12. The lens apparatus according to claim 1, wherein the first light detector, the second light detector, and the third light detector are disposed so as not to overlap one another in a rotation direction of the operation ring.

13. The lens apparatus according to claim 1, further comprising:
a first flexible printed circuit board disposed on the fixed member with the first light detector; and
a second flexible printed circuit board disposed on the fixed member with the second light detector and the third light detector,
wherein the first flexible printed circuit and the second flexible printed circuit are disposed so as not to overlap one another in a rotation direction of the operation ring.

14. An imaging apparatus comprising:
a lens apparatus; and
an image sensor configured to receive an image formed by the lens apparatus,
wherein the lens apparatus includes:
a fixed member having one of a click generator and a groove part in which a groove part is formed;
an operation ring having the other of the click generator and the groove part, and rotatable relative to the fixed member;
a click detector configured to detect a relative position between the click generator and the groove part, the click detector including a first light shielding plate disposed on the operation ring and having first light shielding portions, and a first light detector disposed on the fixed member; and
a rotation detector configured to detect rotation of the operation ring, the rotation detector including a second light shielding plate disposed on the operation ring and having a second light shielding portion, and a second light detector and a third light detector disposed on the fixed member,
wherein the groove part has groove portions and non-groove portions alternately arranged,
wherein the click generator is biased along an optical axis direction and is in contact with the groove part, and
wherein the click detector and the rotation detector are disposed along the optical axis direction.

15. A lens system comprising:
a fixed member having one of a click generator and a groove part in which a groove is formed;
an operation ring having the other of the click generator and the groove part, and rotatable relative to the fixed member;
a rotation detector configured to detect rotation of the operation ring; and
a controller configured to control a driven member driven based on a rotation operation of the operation ring, wherein the controller is configured to control the driven member based on an average rotational velocity of the operation ring obtained based on the detected rotation.

16. The lens apparatus according to claim 15,
wherein the groove part has groove portions and non-groove portions alternately arranged, and
wherein the click generator is configured to generate a click feeling by biasing the click generator in an optical axis direction toward the groove part during rotation of the operation ring.

17. The lens apparatus according to claim 15, wherein the average rotational velocity is obtained based on the detected rotation during a predetermined time.

18. The lens apparatus according to claim 15,
wherein the lens apparatus is attachable to and detachable from a camera body, and
wherein the controller is configured to transmit the detected rotation to the camera body, and receive the average rotational velocity.

19. The lens apparatus according to claim 15, further comprising a click detector configured to detect a relative position between the click generator and the groove part.

20. The lens apparatus according to claim 19, wherein the controller is configured to control the driven member based on the average rotational velocity updated based on a new click detection signal output from the click detector.

21. The lens apparatus according to claim 20, further comprising a memory configured to store, for each rotation direction, rotation amount information from switching of the click detection signal output from the click detector to entering one of the groove portions of the click generator,
wherein the controller is configured to output click detection information based on the rotation amount information.

22. An imaging apparatus comprising:
a lens apparatus; and
an image sensor configured to receive an image formed by the lens apparatus,
wherein the lens system includes:
    a fixed member having one of a click generator and a groove part in which a groove is formed;
    an operation ring having the other of the click generator and the groove part, and rotatable relative to the fixed member;
    a rotation detector configured to detect rotation of the operation ring; and
    a controller configured to control a driven member driven based on a rotation operation of the operation ring,
    wherein the controller is configured to control the driven member based on an average rotational velocity of the operation ring obtained based on the detected rotation.

* * * * *